July 9, 1963 C. E. LE ROW, JR., ETAL 3,097,321
HIGH ENERGY ARC ELECTRODES
Filed Dec. 5, 1960 2 Sheets-Sheet 1

WITNESSES

INVENTORS
Charles E. LeRow Jr.
& Jack McDonald
BY
Ernest P. Klipfel
ATTORNEY

Fig. 2.
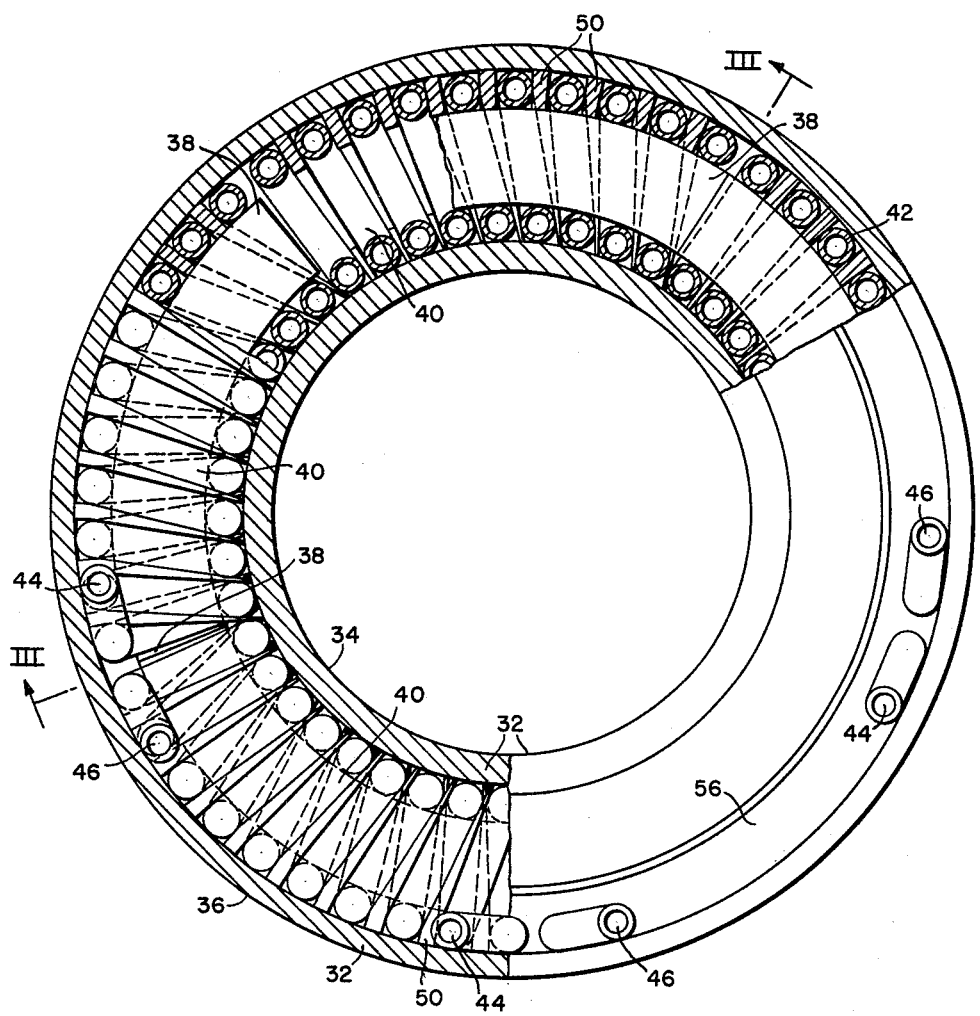
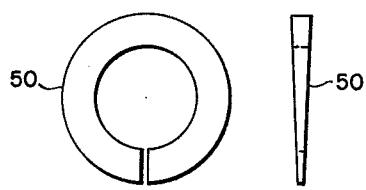
Fig. 4.   Fig. 4A.

United States Patent Office 3,097,321
Patented July 9, 1963

3,097,321
HIGH ENERGY ARC ELECTRODES
Charles E. Le Row, Jr., Trafford, and Jack McDonald, Penn Hills Township, Allegheny County, Pa., assignors to Westinghouse Electric Corporation, East Pittsburgh, Pa., a corporation of Pennsylvania
Filed Dec. 5, 1960, Ser. No. 73,831
8 Claims. (Cl. 313—32)

The present invention relates generally to high energy arc electrodes and more particularly to an electrode of large heat transfer capability.

With the advent of hypersonic flight, it has become very desirable to provide test facilities for missile study and the like. An arc chamber capable of increasing the enthalpy of a gas and supplying a stream at high temperature and pressure for a wind tunnel test section has been claimed and disclosed in a copending application by Werner S. Emmerick, Serial No. 19,528, filed April 4, 1960, and assigned to the same assignee as the present invention. It is desirable to provide such an arc chamber with electrodes capable of sustaining a high energy electric arc for extended periods of time. However, an arc column terminating on an electrode will develop a hot spot thereon which may destroy the electrode. The electrode may erode thereby contaminating the gas flow to the test section.

An electrode in accordance with the present invention sustains a high energy arc for prolonged periods and at an extremely low level of contamination by means of the highly efficient heat transfer path provided from the arc terminating area to the cooling medium.

An object of the present invention is to provide a new and improved electrode capable of sustaining an electric arc of extremely high energy.

Another object of the present invention is to provide an electrode capable of sustaining a high energy arc at an extremely low level of contamination.

Another object of the present invention is to provide an electrode capable of sustaining a high energy arc while greatly reducing ablation and erosion of the electrode.

Another object of the present invention is to provide an electrode having a new and improved heat transfer configuration.

Another object of the present invention is to provide an electrode having a very efficient heat transfer path from the terminal point of the arc to the cooling medium.

Further objects and advantages of the present invention will be readily apparent from the following detailed description taken in conjunction wtih the drawing in which:

FIG. 2 is a plan view, partly in cross-section and partly in further cross-section, of the illustrative embodiment shown in FIG. 1;

FIGS. 4 and 4A are elevational side and end views respectively of still another portion of the present invention.

Figure 1:
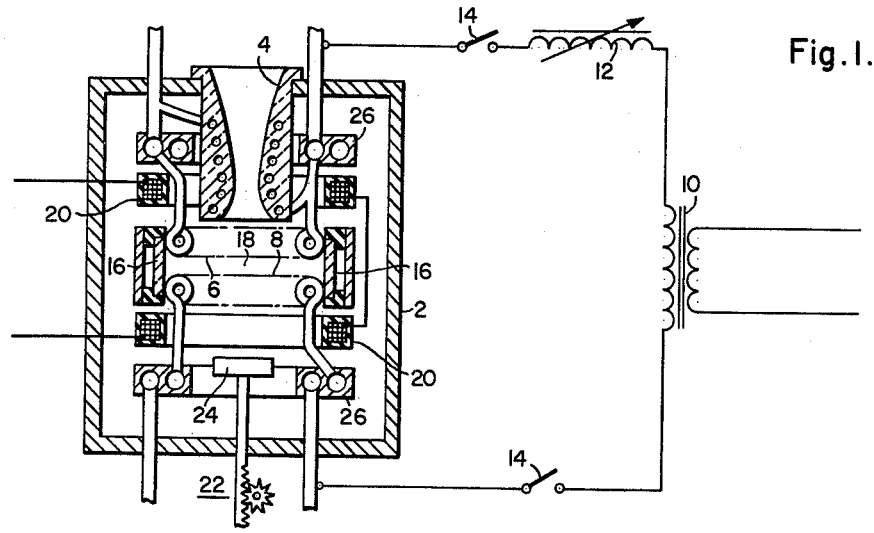
FIGURE 1 is a schematic diagram of an illustrative embodiment of the present invention in an arc chamber for increasing the enthalpy of a gas.

To more clearly understand the present invention, reference is made to FIG. 1 wherein an arc chamber 2 with a nozzle 4 extending therethrough is illustrated. As claimed and more fully described in the aforementioned copending application, an upper electrode 6 and lower electrode 8 are disposed from each other within the chamber 2 and connected with an ionizing potential thereacross provided by a power transformer 10, reactor controller 12 and circuit interrupting means 14. A heat shield 16 forms an envelope 18 around the electrodes. A magnetic field provided by the coils 20 drives the electric arc column around the ring electrodes. The heated gases escape via the nozzle block 4 which may lead to a test chamber for a hypersonic wind tunnel, or the like. As claimed and more fully described in a copending application by Harry J. Lingal, Serial No. 25,762, filed April 29, 1960, and assigned to the same assignee, an arc starting mechanism 22 initiates the arc between the electrodes by advancing a starting electrode 24 to close proximity with the upper electrode 6 and drawing an arc which is transferred to the lower electrode 8 as the starting electrode 24 retracts from the enevelope 18. A manifold 26 provides for the distribution of a cooling fluid within the arc electrodes 6 and 8.

A plan view of the upper electrode with some sections removed and others in cross section is illustrated in FIG. 2. The electrode is shown with a suitable metal jacket 32, substantially toroidal or ring shaped in form and having an inner circumference 34 and an outer circumference 36. Within the jacket 32 is a plurality of filler rods 38, connected in end to end relationship, a total of five being illustrated. A plurality of tubular coils 40 are helically wound upon the filler rods within the jacket 32. While five tubular coils have been illustrated it is to be understood that any suitable number of such coils may be used as well as any suitable number of filler rods 38. Each helical coil 40 comprises in turn a plurality of turns 42 with an entrance lead 44 and an exit lead 46 for the passage of a fluid in heat transfer relationship within the tubular coils 40. Since each tubular coil 40 has an entrance lead and exit lead 44 and 46 respectively, a manifold is provided for the simultaneous feeding of fluid through each tubular coil 40. The manifold will be discussed more fully hereinafter.

It can be seen that when the tubular coils 40 are wound upon the filler rods 38 that space remains between each turn 42, which space is greater between the portion of the turns 42 located adjacent the outer circumference 36 in comparison to that portion of the turns 42 located adjacent the inner circumference 34. To fill this accessible space between adjacent turns 42, a plurality of spacers 50 is provided as shown in FIGS. 4 and 4A.

Each spacer 50 is of split ring form and has a linearly increasing thickness along a diameter lying in the plane of the portion removed or split from the spacer 50. The thickness increases from the end of the diameter located at the removed portion of the spacer 50 to the opposite end of the diameter. It can be seen from FIG. 4 that the free ends of the spacer 50 may be displaced axially from each other and thereby positioned to fill the accessible space between turns 42 within the jacket 32. Thus, all accessible space is filled with solid rods 38 and spacers 50 within and around each turn 42 of each tubular coil 40.

Figure 3:
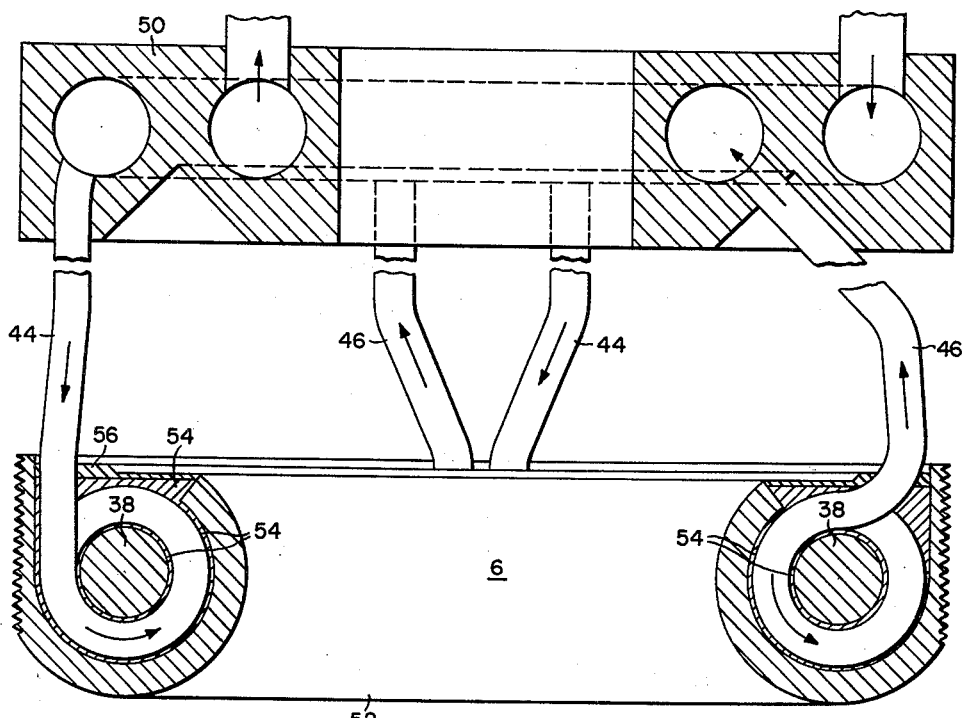
FIG. 3 is a sectional view taken along the line III—III in FIG. 2 showing its interconnection with another portion, in section, of the present invention.

FIG. 3 illustrates a section view taken along the line III—III wherein an entrance lead 44 and exit lead 46 are shown leading into the jacket 32 and to a particular turn respectively of an associated tubular coil 40. FIG. 3 affords an understanding of the fluid flow within the ring electrodes. A manifold 50 having means leading to and from an external heat exchanger and to each tubular coil 40 is illustrated with arrows indicating the direction of fluid flow through the system. Within the manifold 50 the cooling fluid is dispersed for entry into the helically wound cooling coils 40 and hence returned to the manifold 50 by the exit leads 46 for return to the external heat exchanger.

Referring to FIG. 3 it can be seen that an arc sustained between the upper electrode 6 illustrated and a lower electrode will terminate on each electrode on an arc terminating area 52. Since the arc column terminates on the area 52 it is readily apparent that this area of the electrode is most susceptible to the development of a hot spot offering potential destruction of the electrode unless the heat is efficiently and swiftly removed from the arc terminating area 52. Should a hot spot impinge upon the electrode the heat generated at the spot where the arc impinges can establish steam formation within the helical cooling coils 40. The resultant air pocket formed by steam formation has a relatively poor heat conductivity and further increases the difficulty of maintaining the arc terminating area 52 at as low a temperature as possible. Therefore the tubular coils 40 are disposed to provide a tangential flow of fluid across the inside of the jacket 32, obtaining a greater scrubbing action in the inner recesses of the electrode. Since the motion of the arc column and the direction of flow of the cooling fluid are perpendicular to each other, maximum heat exchange is obtained. As the terminal of the arc column is driven around the arc terminating area 52 by the magnetic field applied transversely thereto, the cooling fluid maintains a direction of flow perpendicular to the arc column and its track.

In constructing an electrode in accordance with the present invention the electrode is machined from a rolled copper plate with a channel formed therein for the receipt of the tubular coils 40. The coils 40 are mounted as shown and all accessible space filled with solid copper rods 38 and spacers 50. The purpose of this filling is of course to obtain the best possible construction to facilitate heat transfer. A mandrel presses the inner circumference of the electrode block around the tubular coils 40 without crushing them. Any remaining space within the jacket 36 is then filled by a phosphorus copper braze which is heated to a temperature just below the melting temperature of the elements within the electrode, usually constructed of copper. As the phosphorus boils out it is scraped from the surface until a substantially pure deposit of copper braze reaches the inner recesses of the electrode jacket 32 and fills all voids therein. Of course, the copper braze is an excellent heat transfer solder so that every element is intimately connected with the inner side of the arc terminating area 52. Thus, an ideal heat transfer path is provided from the arc terminating area 52 to the cooling fluid passing within the tubular coils 40. The braze 54 is then capped by a pure silver metal 56, or other suitable metal preventing oxidation of the copper braze 54. Of course, any non-oxidizing surface metal may be used for the capping purposes. To facilitate the mounting of the ring electrodes and allow the spark gap between the upper electrode 6 and lower electrode 8 to be varied, an outside edge of the electrode is threaded for mounting and positioning within the arc chamber 2.

In operation, the cooling fluid is delivered to the tubular coils 40 at a pressure which may be 400 pounds per square inch. Since the cooling fluid passes through the coils at a high speed and with a scrubbing action which prevents gas layers or bubbles from developing and interfering with the cooling of the electrode, a highly efficient heat transfer system is provided, allowing the development of a higher energy electric arc between the electrodes. From the tubular coils 40 the outgoing fluid is returned to the manifold 50 and hence to an external heat exchanger means after which the fluid may be again returned for reuse within the heat transfer system.

While the present invention has been described with a particular degree, for the purposes of illustration, it is to be understood that all equivalents, alterations and embodiments within the spirit and scope of the invention are herein meant to be included. For instance, it is to be understood that while only two electrodes have been illustrated as in a single phase power supply system, that additional electrodes may be used for a multi-phase power system. The present invention is also applicable for D.C. power supply systems. While the present invention has been described in relation to an arc chamber for use with a hypersonic wind tunnel, it is to be understood that its use is universal to all apparatus requiring electrodes with a high energy arc thereacross.

We claim as our invention:

1. An electrode comprising, in combination; a substantially ring shaped member having an electrical arc terminating area; a plurality of tubular coils each helically wound on an annular axis disposed between the inner and outer circumference of said ring shaped member; said tubular coils adapted to allow fluid flow therethrough in a direction perpendicular to the arc column of said electric arc.

2. An electrode comprising, in combination; a substantially ring shaped member having an arc terminating area of annular configuration; a plurality of rods peripherally spaced within said ring shaped member in an end to end relationship and disposed on a circumference between the inner and outer circumference of said ring shaped member; a plurality of tubular coils helically wound upon said plurality of rods and peripherally spaced in an end to end relationship within said ring shaped member; each coil having an entrance means and exit means for cooling fluid; said tubular coils providing a path for said cooling fluid perpendicular to the track of the arc terminal on said arc terminating area.

3. An electrode comprising, in combination; a substantially ring shaped member having an arc terminating area; a plurality of rods peripherally spaced within said ring shaped member in an end to end relationship and disposed on a circumference between the inner and outer circumference of said ring shaped member; a plurality of tubular coils helically wound upon said plurality of rods and peripherally spaced in an end to end relationship within said ring shaped member; a plurality of spacers each disposed between adjacent turns of each said coil; each said spacer being of split ring configuration having a linearly increasing thickness along a diameter located in the plane of the split and having the free ends of the spacer displaced axially from each other to straddle one turn of one said coil and to fill the void between adjacent turns of said one coil; each coil having an entrance means and exit means for a cooling fluid; said tubular coils providing a path for said cooling fluid substantially perpendicular to an arc column and its track on said arc terminating area.

4. An electrode comprising, in combination; a substantially ring shaped member having an arc terminating surface area; a plurality of rods peripherally spaced within said ring shaped member in an end to end relationship and disposed on a circumference between the inner and outer circumference of said ring shaped member; a plurality of tubular coils helically wound upon said plurality of rods and peripherally spaced in an end to end relationship within said ring shaped member; each coil having an entrance means and exit means for a cooling fluid; said tubular coils providing a path for said cooling fluid perpendicular to the track of an arc column on said arc terminating area; a plurality of spacers each disposed between adjacent turns respectively of a coil; said member, rods, coils and spacers having substantially similar thermal expansion characteristics; of similar thermal and a metal braze expansion characteristics disposed within the voids and crevices of said member whereby every part of the surface of each said tubular coil is intimately connected to the arc terminating surface of said electrode in heat transfer relationship therewith.

5. An electrode comprising, in combination; a substantially ring shaped member having an arc terminating area; a plurality of rods peripherally spaced within said ring shaped member in an end to end relationship and disposed on a circumference between the inner and outer circumference of said ring shaped member; a plurality of tubular coils helically wound upon said plurality of rods and peripherally spaced in an end to end relationship within said ring shaped member; each coil having an entrance means and exit means for a cooling fluid; said tubular coils providing a path for said cooling fluid perpendicular to the track of an arc column on said arc terminating area; a plurality of spacers each disposed between adjacent turns respectively of a coil; said member, rods, coils and spacers having substantially similar thermal expansion characteristics; and a heat transfer metal of similar thermal expansion characteristics disposed within the voids and crevices of said member whereby every part of the surface of each said tubular coil is intimately connected to the arc terminating surface of said electrode in heat transfer relationship therewith; and a non-oxidizing surface metal capping the exposed surface of said heat transfer metal.

6. In combination, a first electrode and a second electrode, each electrode being substantially ring shaped in form, means for sustaining an electric arc therebetween, means for driving said electric arc around said electrodes, and coil means within said electrodes between the inner and outer circumference of said electrodes adapted to allow fluid flow perpendicularly to said electric arc and its track across the electrodes.

7. Apparatus for increasing the enthalpy of a gas by electrical energy comprising, in combination; a chamber; at least two ring electrodes disposed within said chamber and spaced apart to form a spark gap; means for connecting an ionizing potential across said electrodes to sustain in arc thereacross; magnetic means for subjecting said arc to a magnetic field transverse to said arc; and heat transfer means for cooling said electrodes including coil means within said electrodes adapted to allow fluid flow perpendicularly to the track of said arc as it rotates around said ring electrodes.

8. Apparatus for increasing the enthalpy of a gas by electrical energy comprising, in combination; a chamber; at least two ring electrodes disposed within said chamber and spaced apart to form a spark gap; means for connecting an ionizing potential across said electrodes to sustain an arc thereacross; magnetic means for subjecting said arc to a magnetic field transverse to said arc; and heat transfer means for cooling said electrodes including coil means within said electrodes adapted to allow fluid flow perpendicularly to the track of said arc as it rotates around said ring electrodes; said coil means comprising a plurality of geometrical arc sections peripherally spaced within said ring electrodes and fluid manifold means for dividing fluid flow to all sections within a given ring electrode from an external heat exchanger.

References Cited in the file of this patent

UNITED STATES PATENTS

| | | |
|---|---|---|
| 1,275,886 | Farnsworth | Aug. 13, 1918 |
| 2,477,077 | Moore | July 26, 1949 |